US011023503B2

(12) United States Patent
Satterfield et al.

(10) Patent No.: US 11,023,503 B2
(45) Date of Patent: Jun. 1, 2021

(54) SUGGESTING TEXT IN AN ELECTRONIC DOCUMENT

(71) Applicant: Textio, Inc., Seattle, WA (US)

(72) Inventors: Jesse Clay Satterfield, Seattle, WA (US); Jensen Michael Harris, Seattle, WA (US); Christopher William Harland, Duvall, WA (US); Dawn Marie Wright, Seattle, WA (US); Kevin William Humphreys, Redmond, WA (US); Martin David McClellan, Seattle, WA (US); Orion Buckminster Montoya, Seattle, WA (US); Olivia Ann Gunton, Seattle, WA (US); Laurie Lee Dermer, Seattle, WA (US)

(73) Assignee: Textio, Inc., Seattle, WA (US)

( * ) Notice: Subject to any disclaimer, the term of this patent is extended or adjusted under 35 U.S.C. 154(b) by 179 days.

(21) Appl. No.: 16/219,808

(22) Filed: Dec. 13, 2018

(65) Prior Publication Data
US 2020/0192921 A1 Jun. 18, 2020

(51) Int. Cl.
*G06F 16/332* (2019.01)
*G06F 16/33* (2019.01)
*G06F 16/31* (2019.01)
*G06F 40/169* (2020.01)

(52) U.S. Cl.
CPC ........ *G06F 16/3323* (2019.01); *G06F 16/313* (2019.01); *G06F 16/3347* (2019.01); *G06F 40/169* (2020.01)

(58) Field of Classification Search
None
See application file for complete search history.

(56) References Cited

U.S. PATENT DOCUMENTS

| 5,873,107 A * | 2/1999 | Borovoy | G06F 16/332 715/234 |
|---|---|---|---|
| 2011/0043652 A1 * | 2/2011 | King | G06F 40/194 348/222.1 |
| 2012/0109884 A1 * | 5/2012 | Goldentouch | G06F 40/166 707/608 |
| 2014/0006424 A1 * | 1/2014 | Al-Kofahi | G06F 40/169 707/754 |
| 2014/0040238 A1 * | 2/2014 | Scott | G06F 16/332 707/722 |
| 2014/0267045 A1 * | 9/2014 | Grieves | G06F 40/242 345/168 |
| 2015/0370769 A1 * | 12/2015 | Filho et al. | G06F 21/6209 726/28 |
| 2016/0110649 A1 * | 4/2016 | Dong | H04W 4/50 706/11 |
| 2018/0101599 A1 | 4/2018 | Arnold et al. | |

* cited by examiner

*Primary Examiner* — Mandrita Brahmachari
(74) *Attorney, Agent, or Firm* — Fenwick & West LLP

(57) ABSTRACT

A user can request suggestions for text to insert at a position in an electronic input document. A set of annotations is obtained from the input document and contextual information associated with the document. A set of candidate texts from source documents are identified for the suggested text and evaluated. Each evaluation may indicate a likelihood that the corresponding candidate text is suitable to insert at the requested position of the input document. One or more of the candidate texts are presented to the client device as the suggested text to insert at the requested position of the electronic document.

15 Claims, 9 Drawing Sheets

VP of Sales
Job Posting for a Sales Role in Seattle, WA

We believe that the future of writing is knowing who will respond to anything you write before you even publish it. Our category-defining augmented writing platform is delighting customers, and our team is growing fast. We have already changed the way that thousands of companies write and hire, and we are hiring a verbal, hungry, and experienced Vice President to lead our team.

416 — Opportunity

SUGGESTING TEXT IN AN ELECTRONIC DOCUMENT

BACKGROUND

Field of Disclosure

The present disclosure generally relates to electronic document storage and retrieval, and more specifically retrieving portions of stored documents based on correspondence with a given document.

Description of the Related Art

Oftentimes, an organization maintains a corpus of stored documents. The documents may have been written by different authors for different purposes at different points in time. The documents may be indexed in the repository using a variety of criteria, such as author, title, and creation time. Retrieving the documents may be a laborious process that involves searching for a document using one or more of the criteria, retrieving a document matching the search criteria, and evaluating the retrieved document for its quality or suitability for a purpose.

For example, an author writing a new document for the organization may wish to produce a document that is similar in style to other documents produced by the organization. To this end, the author may explore the organization's document corpus to find previously-written documents that are similar to the author's new document. This exploration process can be difficult and time consuming due to the drawbacks with document retrieval mentioned above. The difficulties are further compounded when the author is searching for particular sub-components of documents, such as sentences or paragraphs. Existing document retrieval tools are not optimized to support this type of searching. As a result, both human and computational resources are wasted in these situations.

SUMMARY

The above and other issues are addressed by a method, system, and computer-readable medium, for providing suggested text for an electronic input document. An embodiment of the method comprises receiving, from a client device via a computer network, a request for suggested text to insert at a position in the electronic input document and contextual information about the input document. The method further comprises identifying a set of annotations for the input document responsive to the contextual information. The annotations describe predictive characteristics of the suggested text to insert at the requested position of the electronic document. The method evaluates a set of candidate texts generated from a set of source documents using the set of annotations to generate confidence scores for the candidate texts, where a confidence score for a candidate text indicates suitability of the candidate text for use as the suggested text. The method additionally provides at least one of the set of candidate texts to the client device as the suggested text responsive to the confidence scores. The client device is adapted to insert the provided at least one of the set of candidate texts at the requested position of the input document.

An embodiment of the system comprises a computer processor for executing computer program instructions and a non-transitory computer-readable storage medium storing computer program instructions executable by the processor to perform operations. The operations comprise receiving, from a client device via a computer network, a request for suggested text to insert at a position in the electronic input document and contextual information about the input document. The operations further comprise identifying a set of annotations for the input document responsive to the contextual information, where the annotations describe predictive characteristics of the suggested text to insert at the requested position of the electronic document. The operations evaluate a set of candidate texts generated from a set of source documents using the set of annotations to generate confidence scores for the candidate texts, where a confidence score for a candidate text indicates suitability of the candidate text for use as the suggested text. The operations additionally provide at least one of the set of candidate texts to the client device as the suggested text responsive to the confidence scores. The client device is adapted to insert the provided at least one of the set of candidate texts at the requested position of the input document.

An embodiment of the computer-readable medium stores computer program instructions executable by the processor to perform operations. The operations comprise receiving, from a client device via a computer network, a request for suggested text to insert at a position in the electronic input document and contextual information about the input document. The operations further comprise identifying a set of annotations for the input document responsive to the contextual information, where the annotations describe predictive characteristics of the suggested text to insert at the requested position of the electronic document. The operations evaluate a set of candidate texts generated from a set of source documents using the set of annotations to generate confidence scores for the candidate texts, where a confidence score for a candidate text indicates suitability of the candidate text for use as the suggested text. The operations additionally provide at least one of the set of candidate texts to the client device as the suggested text responsive to the confidence scores. The client device is adapted to insert the provided at least one of the set of candidate texts at the requested position of the input document.

BRIEF DESCRIPTION OF DRAWINGS

FIGS. 4A through 4E are example user interfaces for suggesting text to insert in an input document, according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein.

Reference will now be made in detail to several embodiments, examples of which are illustrated in the accompanying figures. It is noted that wherever practicable similar or like reference numbers may be used in the figures and may indicate similar or like functionality.

Figure 1:
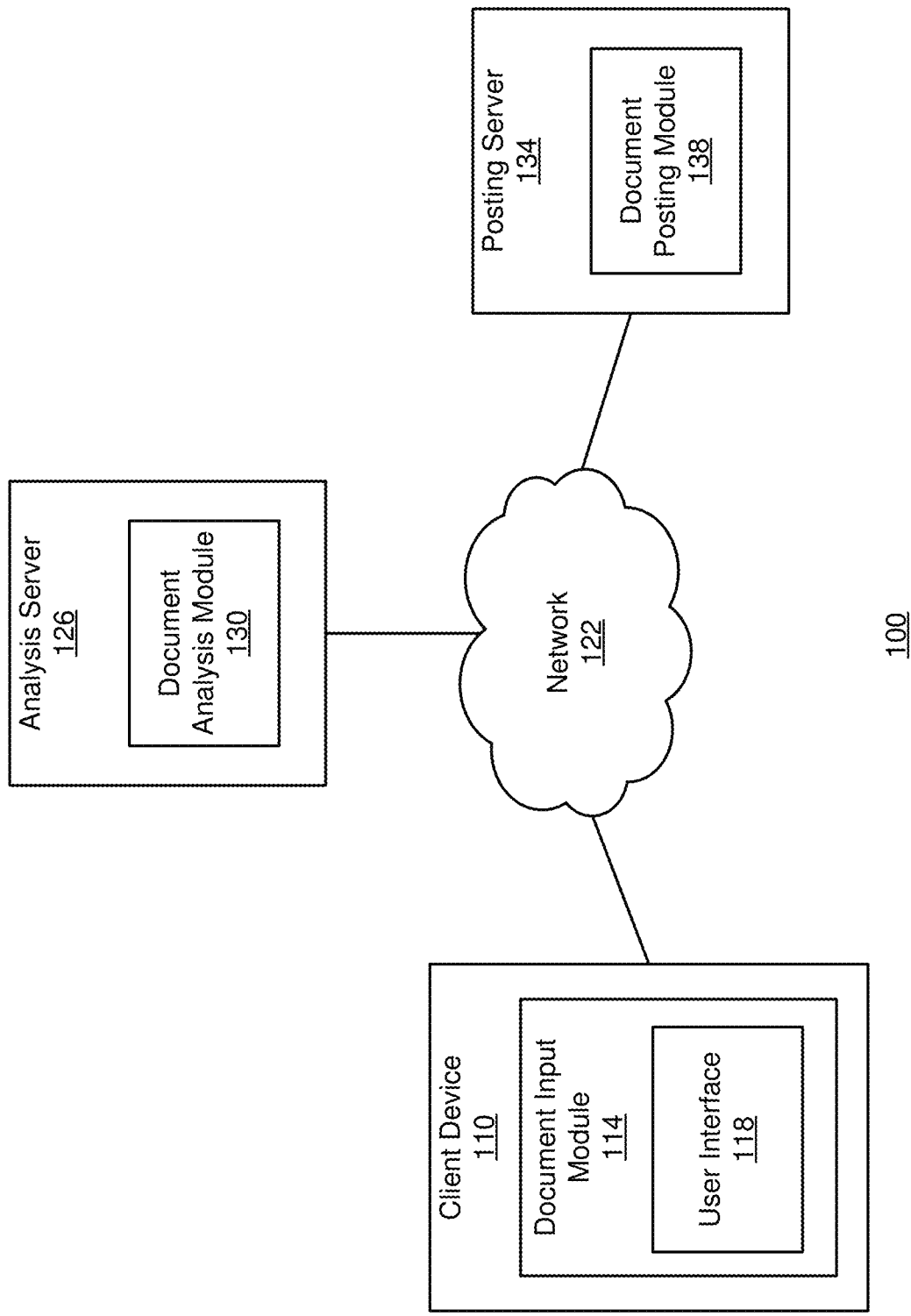
FIG. 1 is a high-level block diagram illustrating an environment for suggesting text in an electronic document, according to one embodiment.

FIG. 1 is a high-level block diagram illustrating an embodiment of an environment 100 for suggesting text in an electronic document, according to one embodiment. The environment includes a client device 110 connected by a network 122 to an analysis server 126 and a posting server 134. Here only one client device 110, one analysis server 126, and one posting server 134 are illustrated but there may be multiple instances of each of these entities. For example, there may be thousands or millions of client devices 110 in communication with one or more analysis servers 126 or posting servers 134.

The network 122 provides a communication infrastructure between the client devices 110, the analysis server 126, and the posting server 134. The network 122 is typically the Internet, but may be any network, including but not limited to a Local Area Network (LAN), a Metropolitan Area Network (MAN), a Wide Area Network (WAN), a mobile wired or wireless network, a private network, or a virtual private network.

The client device 110 is a computing device such as a smartphone with an operating system such as ANDROID® or APPLE® IOS®, a tablet computer, a laptop computer, a desktop computer, or any other type of network-enabled device. A typical client device 110 includes the hardware and software needed to connect to the network 122 (e.g., via Wifi and/or 4G or other wireless telecommunication standards).

The client device 110 includes a document input module 114 that allows the user of the client device 110 to interact with the analysis server 126 and the posting server 134. The document input module 114 allows the user to input a document as formatted text, and forwards the document to the analysis server 126 for evaluation and to the posting server 134 for posting to the computer network 122. The document input module 114 also presents data received from the analysis server 126 and posting server 134 to the user of the client device 110. A client device 110 may also be used by a reader of a posted document to respond to the posting.

In one embodiment, the document input module 114 includes a browser that allows a user of the client device 110 to interact with the analysis server 126 and the posting server 134 via the network 114. In another embodiment, the document input module 114 includes a dedicated application specifically designed (e.g., by the organization responsible for the analysis server 126 or the posting server 134) to enable interactions among the client device 110 and the servers. In one embodiment, the document input module 114 includes a user interface 118 that allows the user of the client device 110 to edit and format the input document and also presents suggested text to insert into the document. The suggested text is received from the analysis server 126 in one embodiment.

The document author may be associated with an organization, and the content of the input document includes text written and formatted by the author directed towards achieving one or more desired objectives when presented to readers. Organizations may be businesses, universities, and the like. A document may be classified into different types depending on its primary objective. For example, a document may be classified as a recruiting document when the primary objective of the document is to gather candidates to fill a vacant job position at a business organization. As another example, the document may be classified as a campaign speech when the primary objective of the document is to relay a political message of a candidate running for government office to gather a high number of votes for an election. Different types of documents may have different objectives.

In one embodiment, at the direction of the user of the client device 110, the document input module 114 submits a request to the analysis server 126 for suggested text to insert at a requested position in the input document. The requested position may be indicated by the location of an input cursor on the document, the location of a pointer from a pointing device, and the like. The document input module 114 receives suggested text from the analysis server 126 and presents it at the requested position of the input document. This presentation allows the user to assess the input document with the suggested text. The user can accept the suggested text and then edit or otherwise update the input document incorporating the suggested text. Further, in one embodiment the user can request to view other suggested texts. Each suggested text is presented at the requested position and the user can select the candidate text that best aligns with the user's needs and preferences.

The analysis server 126 includes a document analysis module 130 that receives requests for suggested texts from a plurality of client devices 110 and provides suggested texts in response thereto. In one embodiment, a request from a given client device 110 includes contextual information describing the input document being drafted on that client device. The contextual information describes predictive characteristics of the text to suggest. Further, the contextual information may include a user query of one or more words that characterize the meaning of the desired suggested text. The document analysis module 130 uses the contextual information to generate the suggested text. Specifically, the document analysis module 130 predicts characteristics of text to insert at the requested position using the contextual information, and then identifies suggested text that satisfies the predicted characteristics and reflects the desired meaning specified by the user. The suggested text may be synthesized from previous documents, and may also be tailored in view of the objective of the input document.

The document analysis module 130 may generate the suggested text based on text of other documents stored by or accessible to the document analysis module 130. These documents are referred to as "source documents" and may have been previously received from the client device 110 and/or other client devices associated with the organization. The document analysis module 130 deconstructs the source documents into units of text, such as pages, paragraphs, sentences, words, and/or lines, and synthesizes the suggested text from these units. The suggested text is generated by extracting the units of text from source documents, or synthesizing text through analyzing the units of text from the source documents. These text units are referred to as the candidate texts and are paragraphs in a particular embodiment described herein.

The document analysis module 130 evaluates the candidate texts to determine whether they are suitable as the suggested text, and provides the suitable candidate texts to the client device 110 as suggested texts for the input document. The evaluations are performed by determining whether characteristics of a candidate text satisfy the predictive characteristics of the suggested text.

Specifically, the document analysis module 130 identifies a set of annotations from the contextual information of the input document that describe the predictive characteristics of the suggested text. The annotations are identified from the written text of the input document and metadata of the input document. For example, annotations may include the text of the input document, the position of the suggested text in the document, information on the user of the document, and information about the purpose of the document. The document analysis module 130 also identifies a set of annotations for candidate texts in source documents. The annotations for candidate texts correspond to similar types of characteristics described in the annotations for the input document and generally describe how well the candidate texts satisfy the predictive characteristics of the suggested text. The document analysis module 130 compares the annotations of the input document with the annotations of the candidate texts using one or more evaluations to determine a search score that indicates whether the candidate texts satisfy the predictive characteristics of the suggested text.

The evaluations are also performed by determining whether the meaning of a candidate text is similar to the meaning of the user query text specified by the user. The user query text is a text unit in the input document provided by the user that encapsulates the desired meaning of the text to insert. The user query text can include, for example, text entered by the user or text that was already written at the requested position of the input document. Responsive to receiving user query text, the document analysis module 130 determines a meaning vector that characterizes the meaning of the user query text. The meaning vector is generated by determining a set of word embedding vectors that each represent a set of words appearing in the user query text. A set of words may include a single word, a phrase, a sequence of words, or a select subset of nouns and words that appear in the candidate text. The word embedding vectors are combined to generate the meaning vector. The document analysis module 130 also identifies meaning vectors for candidate texts that characterize the meaning of the candidate texts. The meaning vector for a candidate text may be determined in a similar way by determining a set of word embedding vectors that each represent a set of words that appear in the candidate text, and combining the word embedding vectors to generate the meaning vector for the candidate text. The document analysis module 130 compares the meaning vector for the input document with meaning vectors for the candidate texts to determine a meaning score that indicates whether a candidate text reflects the desired meaning of the suggested text.

It should be noted that a user query is not necessary to provide suggested text to the user of the client device 110. In such an instance, the document analysis module 130 may evaluate the set of candidate texts by using the set of annotations alone (e.g., using the search score alone) without a separate user query.

The document analysis module 130 combines the evaluations for each candidate text into a confidence score indicating the suitability of the candidate text as the suggested text. The document analysis module 130 may combine the search score and the meaning score into a confidence score. In one embodiment, the document analysis module 130 also evaluates the candidate texts based on the objective of the input document for which the suggested text is being provided. The document analysis module 130 assesses the likelihoods that the input document will achieve its objective if the given candidate texts are inserted into the input document. The confidence scores of the candidate texts may be adjusted based on these assessments. The document analysis module 130 ranks the candidate texts according to the confidence scores to generate a list of evaluated candidate texts.

In one embodiment, the document analysis module 130 also filters the list of evaluated candidate texts to discard texts that have identical or near-identical content as other candidate texts. Specifically, the document analysis module 130 identifies duplicate groups of one or more candidate texts that have a threshold amount of content similarity. The duplicate groups of texts are identified by producing a text hash for each candidate text that summarizes the content of the text absent the actual meaning of the text. Texts that have similar content may produce similar text hashes. The text hashes are compared to one another to identify groups of candidate texts that have a threshold amount of similarity. The document analysis module 130 selects a representative candidate text from each duplicate group, and discards the rest such that a filtered set of candidate texts are provided to the user of the client device 110. This way, the document analysis module 130 can enforce a threshold amount of diversity in the results that are provided to the user, rather than providing the user with multiple duplicate texts.

Additionally, the document analysis module 130 can also filter the list of evaluated candidate texts to discard texts that have a threshold amount of content similarity to texts in the input document. For example, the document analysis module 130 can produce text hashes for text units of the input document, such as the user query for the suggested text or text units that are already written in the input document. The text hashes of the candidate texts can be compared with the text hashes of the input document to identify and discard candidate texts that contain identical or near-identical content to texts of the input document. The filtered set of candidate texts are provided to the client device 110 as suggested texts.

In one embodiment, rather than receiving a user-initiated request for suggested text, the document analysis module 130 continuously and passively examines text units in the written input document as the user is drafting the document, and identifies candidate texts that can replace existing text units in the input document. Candidate texts that have a higher assessment score than the existing text, for example, can be suggested to the user as replacements. Specifically, the document analysis module 130 may continuously identify contextual information for text units in the input document, evaluate a set of candidate texts for each text unit using the identified contextual information, and suggest the candidate texts to the user to replace the existing text. In this case, the text of an already written text unit in the input document can function as the user query for that text unit that the document analysis module 130 can use to determine the meaning of the text unit. The document analysis module 130 may automatically replace text units in the input document, or make suggestions to the user to replace certain text units in the input document to improve, for example, the assessment score of the input document.

The posting server 134 includes a document posting module 138 that posts the input document and receives outcome data about the input document in response thereto. In one embodiment, the posting server 134 receives a completed input document from the client device 110. Alternatively, a user authoring the input document may copy the contents of the input document to an application of the posting server 134 that allows the user to post the input document. The completed input document includes suggested text provided by the analysis server 126. The document posting module 138 posts the input document on a web site or other location on the network 122 that is accessible to third parties. The third parties then respond to the posted input document and the document posting module 138 collects the responses. The document posting module 138 analyzes the responses to produce outcome data describing the outcome of posting the document. The document posting module 138 provides the results of the analyses to the document analysis module 130 where it may be used to evaluate candidate texts based on the objective of input documents and/or for other purposes. Alternatively, the outcome data may be collected by the user authoring the input document, and the user may provide the results of the outcome data to the document analysis module 130. The results of the analyses may also be provided to the client device 110 that submitted the input document.

The outcome data may indicate qualities of the responses with respect to the objectives of the input document. For example, if the document posting module 138 posts a recruiting document with the objective of attracting qualified candidates for a position offered by the organization, the responses may include resumes and other indications of interest from prospective employees. The document posting module 138 analyzes these indications of interest to ascertain aggregate information about the responders. The outcome data in this example may include the number of responses, demographic information about the responders, timing information describing when responses were received, and the like.

The environment 100 shown in FIG. 1 allows a user to efficiently and effectively draft documents for an organization. By interacting with the analysis server 126, the user can quickly identify suggested text to insert at a given position of an input document. The analysis server 126, in turn, analyzes and accesses a corpus of other documents from the same organization and/or other sources in order to identify or synthesize candidate texts to present as suggested text to the user. As a result, the user can quickly identify text units of documents in the corpus or text units that were synthesized based on documents in the corpus that meet the user's needs given a position in the input document and the user's objectives for the document. The user does not need to use a document retrieval tool to laboriously search through prior documents in order to find appropriate text. Moreover, although the user may only provide rough outlines or ideas of what the suggested text should incorporate, the analysis server 126 can synthesize suggested text that incorporates these ideas in polished form without the user having to wordsmith the text from scratch.

Figure 2:
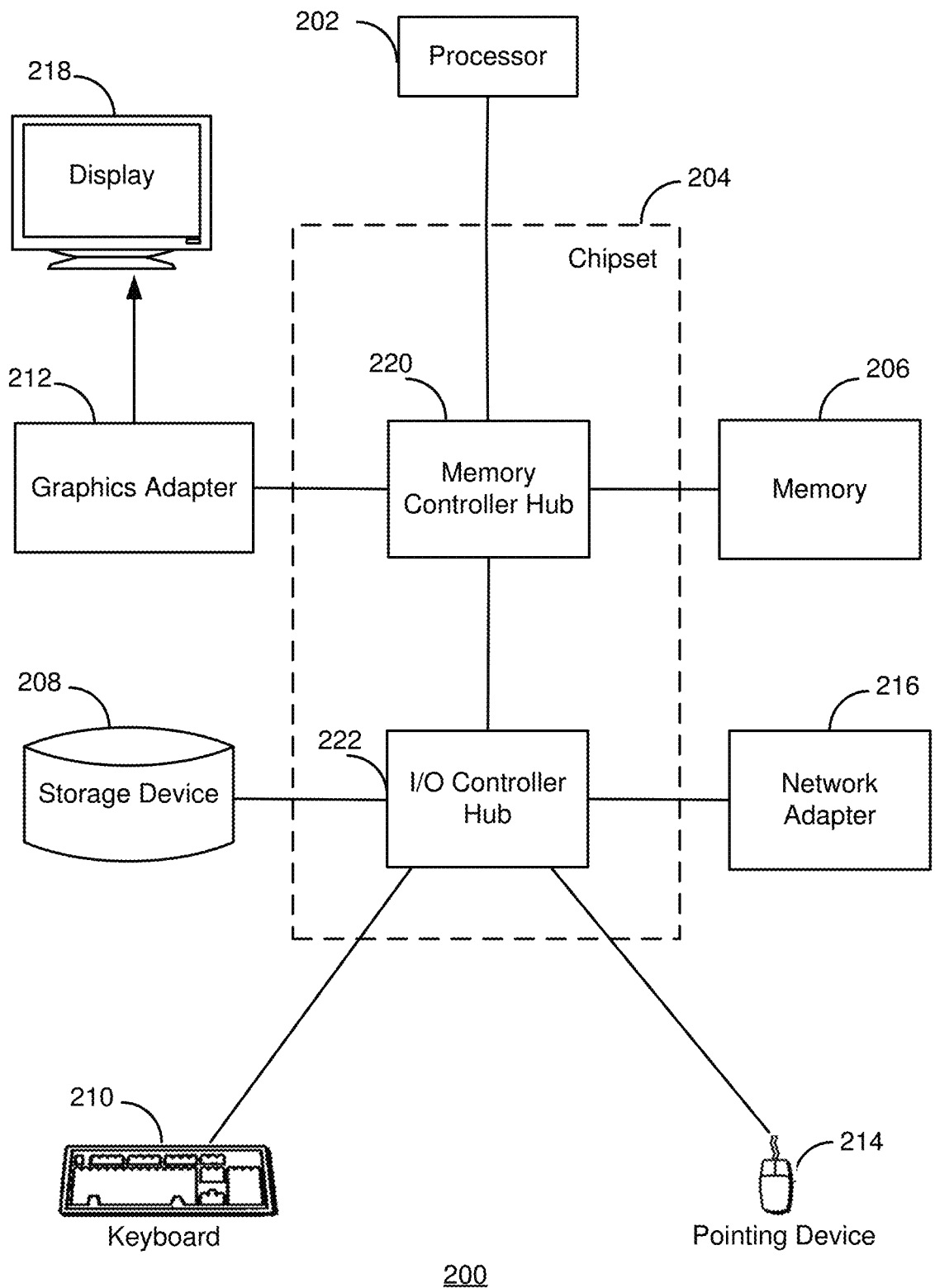
FIG. 2 is a high-level block diagram illustrating an example computer for implementing the client device, the analysis server, and/or the posting server of FIG. 1.

FIG. 2 is a high-level block diagram illustrating an example computer 200 for implementing the client device 110, the analysis server 126, and/or the posting server 134 of FIG. 1. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, an input device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The input interface 214 is a touch-screen interface, a mouse, track ball, or other type of pointing device, a keyboard, or some combination thereof, and is used to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. The computers 200 can lack some of the components described above, such as graphics adapters 212, and displays 218. For example, the analysis server 126 can be formed of multiple blade servers communicating through a network such as in a server farm.

Figure 3:
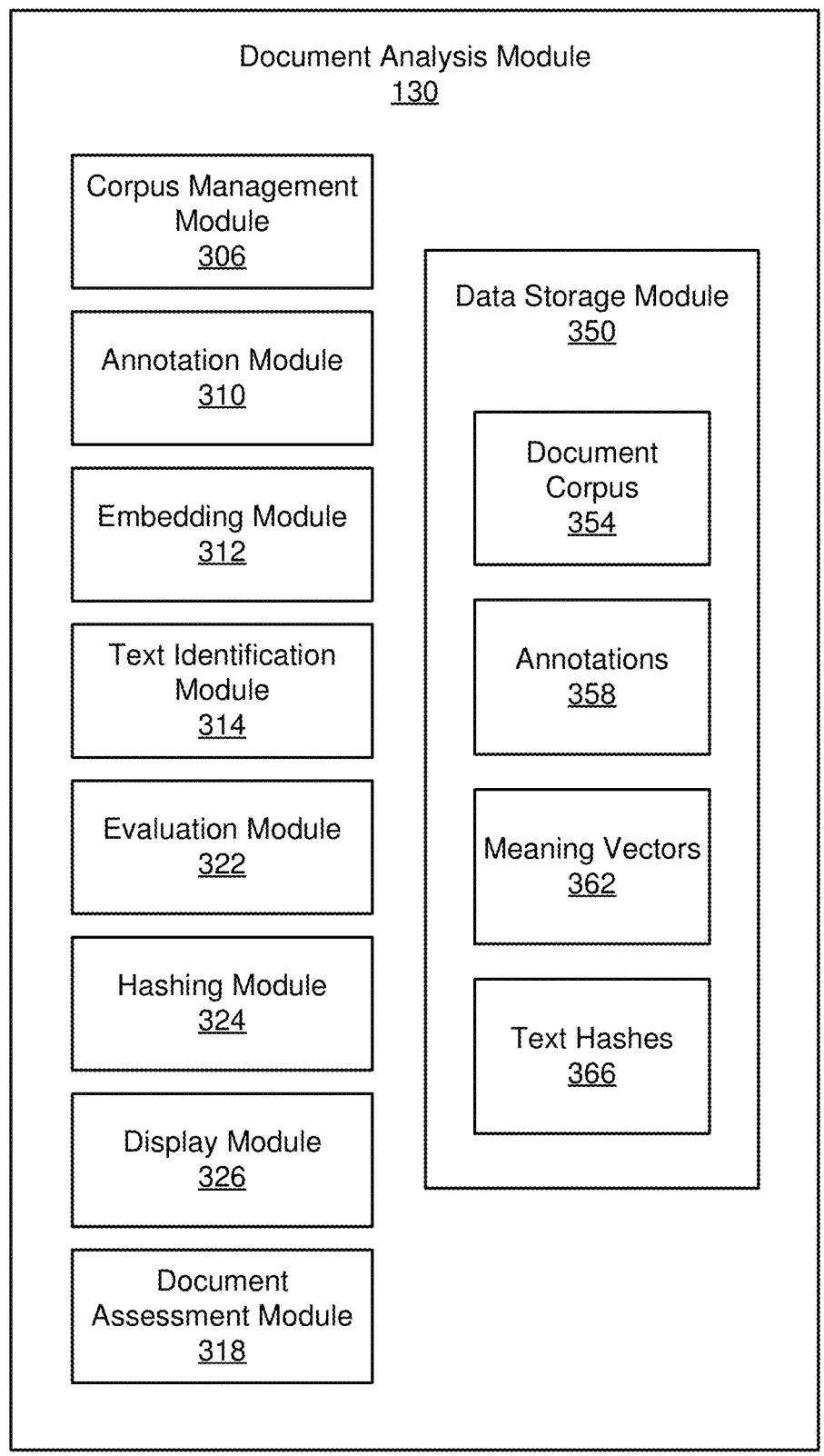
FIG. 3 is a high-level block diagram illustrating a detailed view of the document analysis module of the analysis server, according to one embodiment.

FIG. 3 is a high-level block diagram illustrating a detailed view of the document analysis module 130 of the analysis server 126, according to one embodiment. The document analysis module 130 is comprised of modules including a data storage module 350, a corpus management module 306, an annotation module 310, a text identification module 314, a document assessment module 318, an evaluation module 322, and a display module 326. Some embodiments of the document analysis module 130 have different modules than those described here. Similarly, the functions can be distributed among the modules in a different manner than is described here.

The data storage module 350 stores data used by the document analysis module 130. The data storage module 350 includes a document corpus data store 354 and an annotations data store 358. The document corpus data store 354 stores a corpus of documents that serve as source documents for the document analysis module 130. The document corpus 354 is a collection of documents that were previously written by authors associated with organizations. For example, the corpus can be formed of documents that were previously written by users of client devices 110 associated with various organizations. The corpus can also include documents from other sources, such as documents publicly available on the network 122.

The corpus 354 also stores metadata associated with the documents. The metadata describes attributes of the documents. The metadata for a document can include, for example, the author, organization, and objective of the document, the date the document was created, and the like. As another example, metadata for recruiting documents can include the title of a job position, location of the job position, and the like. The metadata can also include outcomes associated with the documents received from the posting server 134.

The annotations data store 358 stores annotations associated with the documents in the document corpus data store 354. The annotations describe predictive characteristics of candidate texts within the source documents. The annotations are generated from the contextual data of the documents, which may include the content of the documents, and/or the metadata of the documents. Annotations may pertain to documents as a whole, and may also pertain to particular text units within the documents. The annotations for the documents may include, for example, the positions of text units within the documents, sets of key phrases that describe the content of documents and/or text units within the documents, describe the content of text units of a document surrounding a given text unit, describe the content of other documents generated by the same author and/or organization, and the like.

The corpus management module 306 generates, maintains, and updates the document corpus 354. The corpus management module 306 may collect documents in the document corpus 354, as well as their metadata, from various sources and store the documents in the corpus. In one instance, the corpus management module 306 collects documents from client devices 110 and collects outcomes from the posting server 134. The corpus management module 306 may also collect documents by crawling websites on the network 122, or which were provided by other sources. In one embodiment, the corpus management module 306 continuously and automatically updates the document corpus 354 as new documents with a set of known outcomes are received from the various sources.

The annotation module 310 generates annotations for documents and text units within documents. The documents for which annotations are generated include both input documents and source documents. In one embodiment, the annotation module 310 preprocesses source documents in the document corpus 354 to generate annotations for the source documents, and also for text units within the source documents. These annotations are stored within the annotation data store 358. The annotation module 310 generates annotations for input documents, and text units of the input documents, dynamically as the input documents are received from the client devices 110 with associated suggestion requests. The annotations for the input documents may be stored in the annotations data store 358 or discarded after use.

The set of annotations generated for a document may include the document author and organization associated with the document, the objective of the document, sets of key phrases or other representations that describe the content of the document, descriptions of other documents generated by the same author and/or organization, the format and/or structure of the document, and the like. The set of annotations generated for a text unit within a document may include the position of the text unit in the document, a set of key phrases or other representations that describe the content of the text unit, and references to other annotations describing text units located near given text unit within the document. The annotations for a document and/or text units of the document may also be generated based contextual information provided for the document and text units. The annotations for text units within a document may each inherit the annotations for the document, in addition to annotations that are specific to the text unit.

The meaning vectors store 362 stores meaning vectors associated with the documents in the document corpus data store 354. The meaning vectors are numerical vectors that characterize the meaning of text units in the source documents. The meaning vectors are generated from word embedding vectors that represent sets of words appearing in the text unit. In one embodiment, a text unit is associated with two types of meaning vectors, a coarse vector and a fine vector. The coarse vector has lower precision than the fine vector, and allows quick, coarse-grained matching compared to the fine vector.

The embedding module 312 generates meaning vectors for text units within documents. The documents for which meaning vectors are generated include both input documents and source documents. In particular, meaning vectors are generated for text units in input documents, as well as text units in source documents. In one embodiment, the embedding module 312 preprocesses source documents in the document corpus 354 to generate meaning vectors for text units within source documents. These meaning vectors are stored within the meaning vectors store 362. The embedding module 312 also generates meaning vectors for text units in input documents, such as user query texts. Similarly, the meaning vectors for the user query text may be associated with a coarse vector and a fine vector. The meaning vectors for user query texts may be stored in the meaning vectors store 362 or discarded after use.

In one embodiment, the embedding module 312 generates a meaning vector for a text unit by applying a machine-learned embedding model to the sets of words that make up the text unit. The embedding model is configured to receive a set of words, and output a word embedding vector that characterizes the meaning of the set of words. The word embedding vector may describe the set of words with respect to other words that frequently appear in association with the set. Generally, the smaller the distance between two word embedding vectors the more similar are the meanings of the sets of words represented by the vectors, and the greater the distance the more different are the meanings of the sets of words represented by the vectors. In one instance, the embedding module 312 generates a one-hot encoded numerical vector that contains non-zero values only for those elements that correspond to the set of words in the text. The embedding model is applied to the one-hot encoded vector to generate the word embedding vector for a set of words.

In one instance, the embedding model is trained using words contained in a training corpus of documents. The parameters of the embedding model are trained based on the finding that words that appear in the same linguistic context share similar meaning. For example, set of words that are likely to appear with the same context of words may produce similar word embedding vectors. As another example, sets of words that are likely co-occur with each other may also produce similar word embedding vectors. In one instance, the embedding model is configured as a neural network model, such as a deep learning model, a word2vec model including a skip-gram model, or as an ELMO representation.

The meaning vector for a text unit is generated by combining the word embedding vectors for the text unit. For example, the meaning vector may be an average or weighted average of all the word embedding vectors for the text unit. Thus, the meaning vector for a text unit collectively encapsulates the meaning of the sets of words that make up the text. In one embodiment, the embedding module 312 generates both a coarse vector and a fine vector for a meaning vector. The fine vector may be output by the embedding model, and the coarse vector may be generated by partially discarding information from the fine meaning vector to reduce the resources required to store or process the vector. For example, the embedding module 312 may discard a subset of elements from the fine meaning vector, or reduce the precision of the values included in the fine vector by quantizing the values in the fine vector.

In cases where the user has not provided a user query in the input document, the embedding module 312 may set the meaning vector for the input document as a null vector, such that candidate texts are not evaluated on the basis of a user query but rather on the set of annotations or the assessment score of the input document alone.

The text identification module 314 identifies candidate texts in response to requests for suggested text received from client devices 110. The text identification module 314 receives a request for suggested text for an input document from a client device 110 and associated contextual information. The text identification module 314 uses annotations and embedding vectors generated from the request and contextual information, annotations from the annotation storage 358, and meaning vectors from the meaning vectors storage 362 to evaluate a set of candidate texts in the document corpus 354 for suitability as suggested texts. In one embodiment, the candidate texts are selected from among the text units generated from source documents of the document corpus 354 that are associated with the same organization as the input document. In other embodiments, the text identification module 314 may select candidate texts from other source documents as well.

The text identification module 314 returns the most suitable candidate texts as suggested texts in response to the request. For example, the text identification module 314 may rank the set of candidate texts according to their confidence scores (described below), and provide the highest-ranked candidate texts to the client device 110 as suggested texts. The text identification module 314 may also determine a minimum threshold for the confidence scores, and discard candidate texts that have confidence scores below the minimum threshold for use as suggested text.

The text identification module 314 may dynamically update the evaluations as a user of a client device 110 updates the input document and its contextual information. The text identification module 314 may receive updated requests for suggested text from a client device 110 in the form of new requests or additional contextual information for a previous request. For example, the text identification module 314 may receive an updated request indicating that the user has provided additional words characterizing the content of the desired suggested text. The text identification module 314 interacts with the evaluation module 322 using the updated contextual information to obtain new suitable candidate texts and/or re-rank the previous and new candidate texts based on the updated information. This updating may occur in real-time, as the user interacts with the client device 110 to update the input document and/or contextual information.

In one embodiment, the text identification module 314 filters the set of candidate texts to discard texts that have identical or near-identical content as other candidate texts. The text identification module 314 uses text hashes stored in the text hash store 366 (described below) to identify candidate texts that contain similar content. The text identification module 314 compares text hashes for the set of candidate texts to one another to identify duplicate groups of texts that have a threshold amount of content similarity. The text identification module 314 filters the set of candidate texts by selecting a representative text from each duplicate group and discarding the remaining texts to enforce a threshold amount of diversity.

The text identification module 314 can also filter the set of candidate texts to discard candidate texts that have identical or near-identical content as text units in the input document, such as the user query text or existing text units that are already written in the input document. The text identification module 314 interacts with the hashing module 324 (described below) to obtain text hashes for text units in the input document. The text identification module 314 further filters the set of candidate texts by discarding candidate texts that have text hashes within a threshold amount of similarity with text hashes of the input document. This way, the document analysis module 130 can provide candidate texts that are not duplicates of text that is already included in the input document. The text identification module 314 provides the filtered set of candidate texts to the user of the client device 110.

In one embodiment, the text identification module 314 can also passively examine text units in the written input document as the user is drafting the document, and for certain text units, identify a set of candidate texts that can replace the text unit in the input document. The text identification module 314 interacts with the evaluation module 322 to obtain evaluations for candidate texts that are determined based on contextual information for the text unit in the input document. The text identification module 314 may rank the candidate texts, and suggest the candidate texts to the user as replacements for existing texts if the candidate texts improve, for example, the overall assessment of the input document.

The evaluation module 322 evaluates candidate texts to determine the texts' suitability as suggested texts. The evaluation module 322 is called by the text identification module 314 and passed the annotations generated from the request and the annotations associated with one or more candidate texts from the document corpus 354. The evaluation module 322 compares the annotations generated from the request to the annotations associated with the individual candidate texts and, for each text, determines a confidence score indicating the relative suitability of the candidate text as suggested text for the input document.

The confidence score for a candidate text is determined by combining a search score and a meaning score. The search score is determined from a series of one or more evaluations that each indicate whether the candidate text satisfies a predictive characteristic for the suggested text by comparing the set of annotations of the input document to the set of annotations for a candidate text. The meaning score is determined from a series of one or more evaluations that each indicate how similar the meaning of the candidate text is to the meaning of the user query text. In some cases, the evaluation module 322 may set minimum thresholds for each type of evaluation score, and discard candidate text that have a corresponding confidence score below the minimum threshold for use as suggested text.

The search score for each candidate text is determined by comparing the set of annotations for the input document to the set of annotations for the candidate text to produce a series of one or more evaluation scores that each indicate similarity between an annotation of the candidate text and the corresponding annotation of the suggested text. Specifically, an evaluation score for a candidate text may also include a comparison of the relative location of the suggested text within the input document with the relative location of the candidate text in the source document. These evaluations may be based, for example, on the distances of the locations from the beginning, middle, ends, and/or arbitrary points within the documents. The evaluation score may indicate how well the position of the candidate text corresponds to the position of the suggested text. This evaluation reflects a finding that a candidate text that appears in the same relative position within a source document that the suggested text appears in the input document is a better candidate. Thus, the greater the correspondence between the positions, the higher the score.

In addition to the evaluation scores discussed above, other evaluation scores for a candidate text can also include whether the source document of the candidate text is associated with the same organization as the input document, whether the source document shares the same objective as the input document, and whether the source document and input document share the same author. These evaluation scores are combined to generate the search score. Generally, greater similarity in any of these evaluations results in a higher search score for the candidate text under consideration.

The meaning score for each candidate text is determined by comparing the distances between a meaning vector for the user query text and the meaning vector for the candidate texts. The distances indicate similarity between the user input (which indicates the desired meaning of the suggested text) and the meaning represented by the candidate text. These evaluations may produce meaning scores that are inversely proportional to the determined distances. The evaluation module 322 determines the confidence score by combining the meaning score and the search score. In one instance, when the meaning vector is a null vector indicating that the user has not provided a user query, the evaluation module 322 determines the confidence score as the search score.

In one instance, the evaluation module 322 determines the search score and the meaning score only for a subset of candidate texts that are identified using coarse vectors. The evaluation module 322 first compares the coarse vector for a user query text to coarse vectors of the set of candidate texts to identify a subset of best matching candidate texts that have a threshold amount of similarity. For example, the evaluation module 322 may first identify 1,000 candidate texts that are each associated with coarse vectors having a threshold amount of similarity to the coarse vector of the user query text. The remaining candidate texts may be discarded for use as suggested text. The evaluation module 322 determines the search score and the meaning score only for the identified subset of candidate texts. Specifically, the evaluation module determines the meaning scores by comparing the fine vector for the user query text to the fine vectors of the candidate texts in the identified subset. This way, the evaluation module 322 can evaluate candidate texts in a computationally efficient manner since it only has to determine search scores and meaning scores for the identified subset of candidate texts instead of the entire set.

The text hash store 366 stores text hashes associated with the documents in the document corpus data store 354. The text hashes summarize the content of the candidate texts within the source documents absent the meaning of the texts. Texts that have similar content may produce similar text hashes. For example, the more words that are shared the more similar the text hashes, and less words that are shared the more different are the text hashes for a pair of candidate texts.

The hashing module 324 generates text hashes for text units within documents. The documents for which text hashes are generated include both text units in input documents and source documents. In one embodiment, the hashing module 324 preprocesses source documents in the document corpus 354 to produce text hashes for text units in source documents. These text hashes are stored within the text hash store 366. The hashing module 324 generates text hashes for text units in input documents, including the user query text and existing text units in the input documents, dynamically as the input documents are received from the client devices 110 with associated suggestion requests. The hashing module 324 interacts with the text identification module 314 to provide text hashes for input documents. The text hashes for input documents may be stored in the text hash store 366 or discarded after use. In one instance, a text unit is hashed using locality-sensitive hashing to produce the text hash.

The display module 326 interacts with the client devices 110 to provide and/or support the user interface 118 presented by the document input module 114. Specifically, the display module 326 allows the user of the client device 110 to submit a request for suggested text through the user interface 118. For example, the display module 326 may allow the user to click on a button displayed on the user interface 118 to submit a request for suggested text to be inserted at a location of the input document that corresponds to, for example, the position of the input cursor on the input document.

The display module 326 receives suggested texts from the text identification module 314 and provides the suggested texts to client devices 110 for presentation to the users. The display module 326 receives a ranked list of suggested texts in response to a request from a client device 110 and sends the ranked suggested texts to the client device in response. The display module 326 presents the suggested texts to the user within the user interface 118. In particular, the display module 326 presents a suggested text at the requested position of the input document, or may replace existing text in the input document with the suggested text. However, it is appreciated that in other embodiments, the display module 326 may also present the suggested text in a UI element such as a pop-up window or a side pane of the page.

The display module 326 may initially provide the highest-ranking suggested text and then present other suggested texts in descending order of ranking as the user interacts with the user interface to request other texts. Alternatively, the display module 326 may present more than one suggested text simultaneously to the user of the client device 110. For example, the display module 326 can present the list of suggested texts in a side pane of the page containing the input document. The display module 326 allows the user to incorporate the suggested text into the input document, as well as to edit and revise the entire input document. The display module 326 may also present dynamically updated suggested texts as the user edits the input document. The display module 326 may further present information associated with the suggested text. Specifically, the display module 326 may generate a user interface element that contains evaluation results such as the confidence score of the suggested text.

The document analysis module 130 allows users of client devices 110 drafting input documents to quickly identify suggested texts to insert at given positions of the documents. A given user can view an ordered list of suggested texts and consider each suggestion in the context of the input document. The suggested texts can be drawn from and synthesized from source documents produced by the same organization to which the user belongs and/or from other sources. The document analysis module 130 thus provides document retrieval functions optimized to assist the user in drafting documents.

The document assessment module 318 assesses a document to produce assessment scores indicating likelihoods that the document will achieve a defined set of objectives. For example, the document assessment module 318 may generate an assessment of an input document that includes suggested text inserted at the requested position. The document assessment module 318 performs the assessment by extracting a set of features from the document and analyzing the features using one or more machine-learned assessment models that evaluate the likelihoods of the document achieving a set of objectives. The document assessment module 318 derives the assessment scores from the outputs of the assessment models.

In one embodiment, the document assessment module 318 trains the assessment models using source documents in the document corpus 354 and the outcome data received from the posting server 134. The document assessment module 318 determines the objectives associated with the source documents and determines the outcomes of the documents with respect to the objectives from the outcome data. The document assessment module 318 uses the source documents, objectives, and outcomes as training data and trains the assessment models to correlate document content and/or other contextual information and outcomes using supervised machine learning. The document assessment module 318 may train one model for each objective of a set of objectives. The document assessment module 318 may also retrain the models as new documents are posted and stored in the corpus 354.

When the document assessment module 318 receives a document to be assessed, such as an input document including suggested text, the module determines the desired objectives for the document, and applies the appropriate assessment models to the document text. A given assessment model applied to the text produces an output indicating a likelihood that the document will achieve the desired objective, such as a value between zero and one indicating the probability of achieving the objective. The document assessment module 318 converts the output of the models into assessment scores, such as by converting an output probability into a value between one and 100 and/or by quantizing the output into a labeled category.

Examples of objectives and associated models may include whether a recruiting document is likely to receive responses from job applicants having certain qualifications, such as particular levels of educational attainment and/or living in certain geographical areas. As another example, an objective and corresponding model may assess whether the document is likely to receive gender neutral responses (e.g., the responses to a job posting based on the document will receive proportions of male and female applicants indicating that the language in the document is gender neutral). Other types of documents and objectives may also be used.

The document analysis module 130 may use the assessment scores produced by the document assessment module 318 in a variety of ways. In one embodiment, the document assessment module 318 produces separate assessment scores for versions of an input document incorporating each of a set of candidate texts. The document assessment module 318 provides the assessment scores to the text identification module 314, and the latter module combines the assessment scores with the confidence scores produced by the evaluation module 322 and ranks the candidate texts using the combined scores. In this way the rankings of the suggested texts are based at least in part on the assessment of whether the input document including a given suggested text will achieve the desired objective for the document. The document assessment module 318 may also or instead provide the assessment scores to the display module 326. The display module 326 may provide the assessment scores to the client device 110 for presentation in association with the respective suggested texts.

FIGS. 4A through 4E are example user interfaces (respectively labeled 118A-E) for suggesting text to insert in an input document, according to one embodiment. In one embodiment, the user interface 118 is generated by the display module 326 and provided to the client device 110 for display thereon.

Figure 4A:
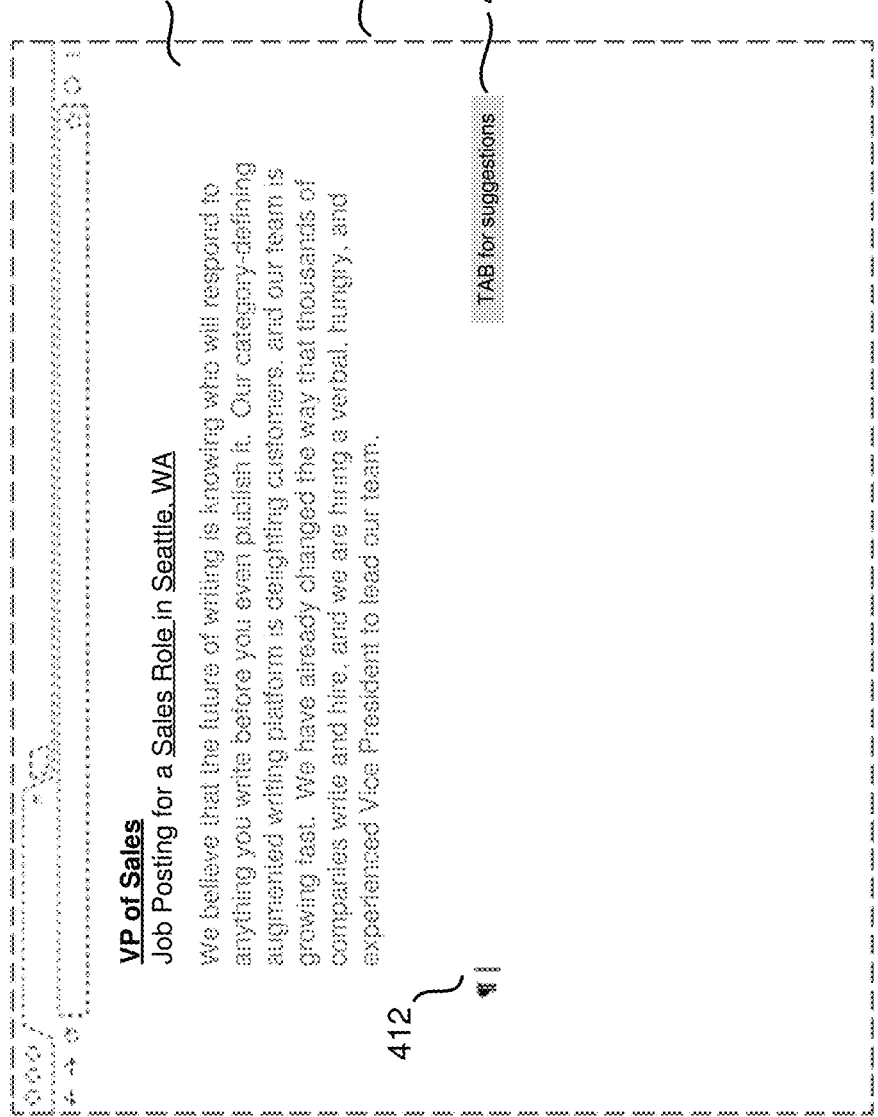

FIG. 4A illustrates an input document 410 generated by a user of a client device 110. The input document 410 is a recruiting document advertising a job title of "VP of Sales," which is a sales role for the company and is geographically based in Seattle, Washington. As shown in the user interface 118A of FIG. 4A, the input document includes a first paragraph written by the user that is primarily an introduction describing the product team and company of the recruiting document. An icon 414 presented by the display module 326 indicates the user can submit a request for suggested text to insert at the location of the input cursor 412 by pressing the "TAB" key. Alternatively, a button may be displayed by the display module 326 that the user can click on to submit the request.

Figure 4B:
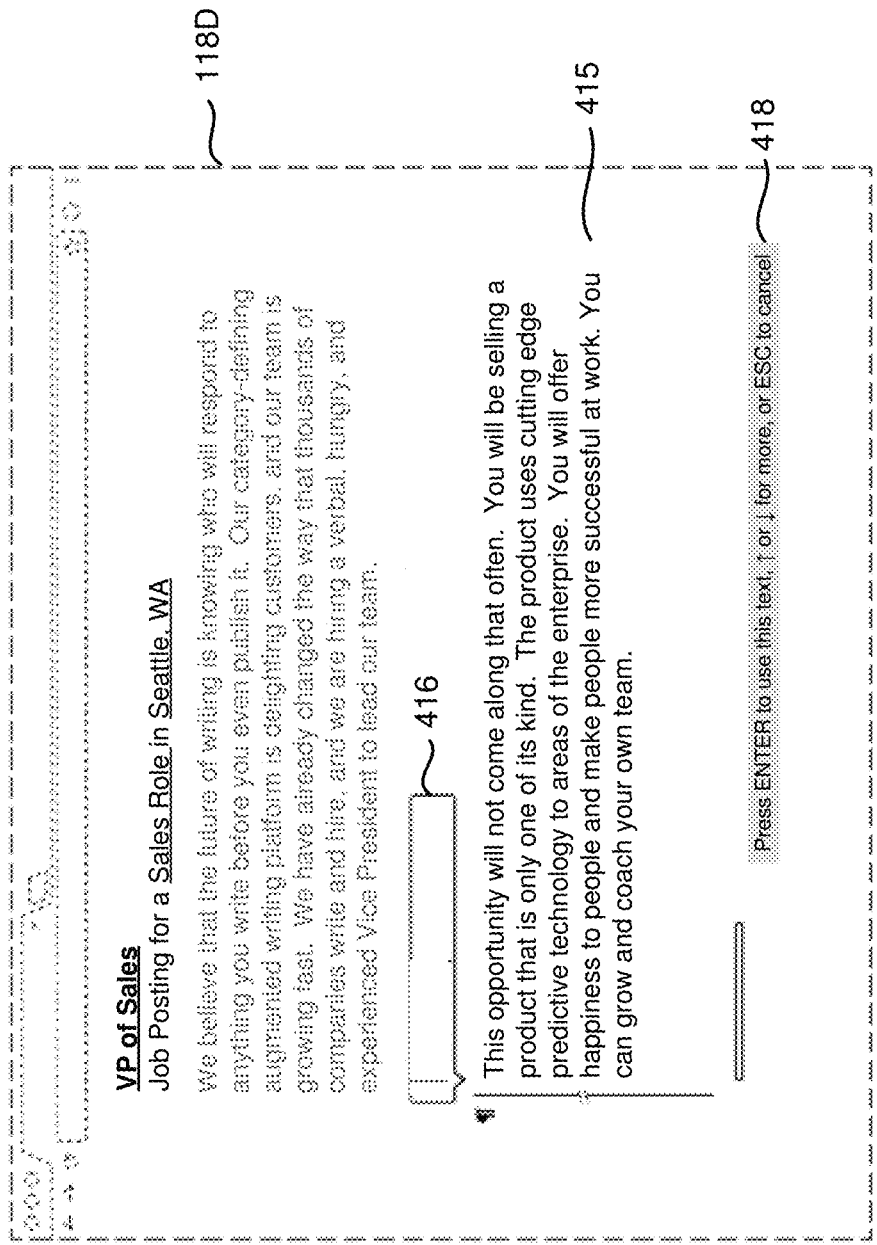

As shown in FIG. 4B, responsive to submitting the request, a text input element 416 is displayed on the user interface 118B that the user can use to input one or more words to describe the desired meaning of the suggested text. The text input element 416 may be displayed at the requested position of the input document. As shown in FIG. 4B, although the user has not entered in a user query, the user may be presented with suggested text 415 inserted at the requested position for the input document. The suggested text 415 is synthesized as the second paragraph of the input document based on the position of the input cursor. The suggested text 415 may be synthesized based on contextual information of the input document 410 including the job title, the relevant team of the organization, the geo-location of the job, the relative position of the text, and the like.

Also shown in FIG. 4B, an icon 418 presented by the display module 326 indicates that the user can press the ENTER key to use the text in the input document, or browse through other suggested texts by pressing the up or down arrow keys. For example, the display module 326 may present the user with the previous suggested text responsive to pressing on the up arrow key, or present the user with the next suggested text responsive to pressing on the down arrow key, each inserted at the location of the input cursor. Each suggested text is displayed individually, and the next and previous suggested texts are based on the ranked order of the candidate texts.

As shown in the user interface 118C of FIG. 4C, the word "opportunity" is provided by the user in the text input element, requesting that the suggested text should describe this topic.

Figure 4D:
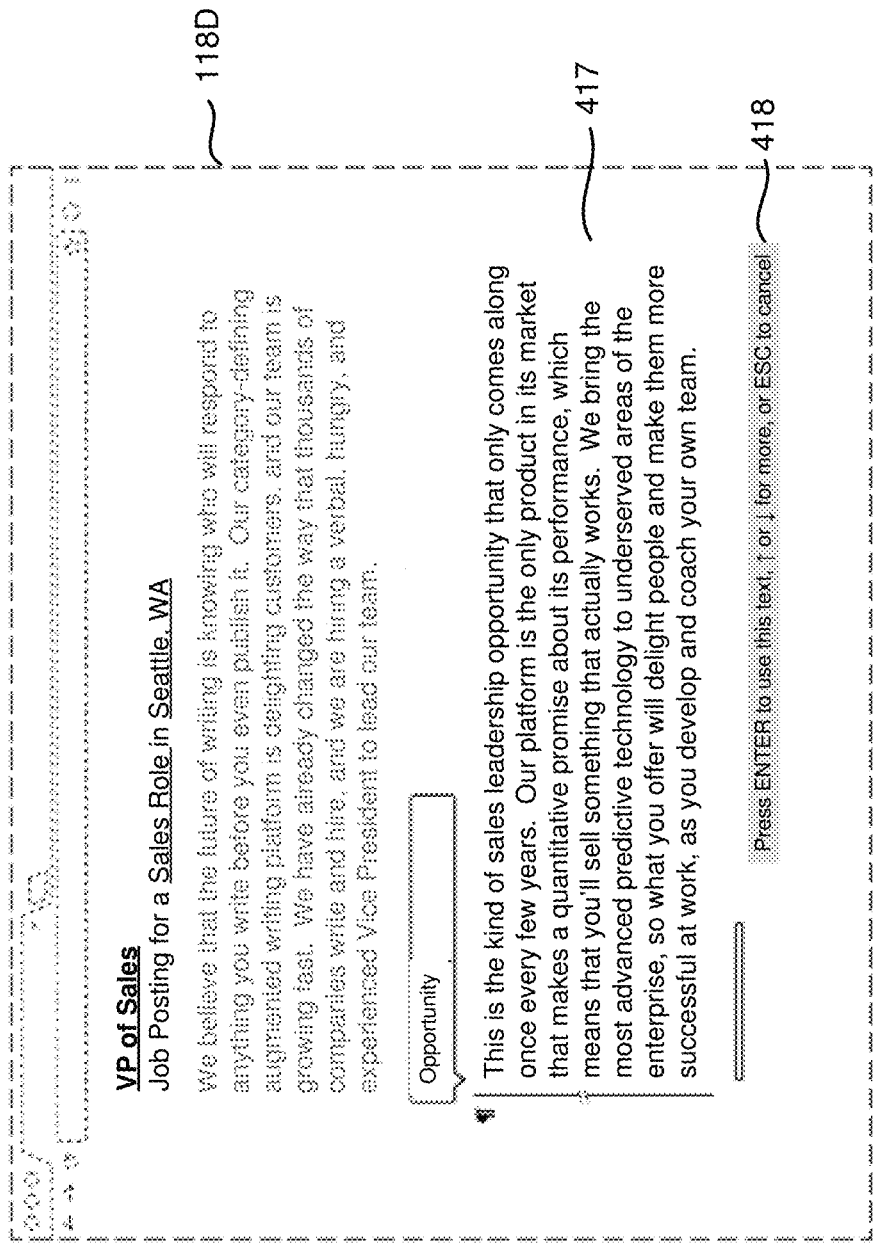

As shown in the user interface 118D of FIG. 4D, the user is presented with updated suggested text 417 that is synthesized additionally based on the user query input shown in FIG. 4C. The suggested text 417 may be synthesized based on contextual information of the input document 410 and additionally the meaning vector for the word "opportunity" input by the user to describe the content of the suggested text.

Figure 4E:
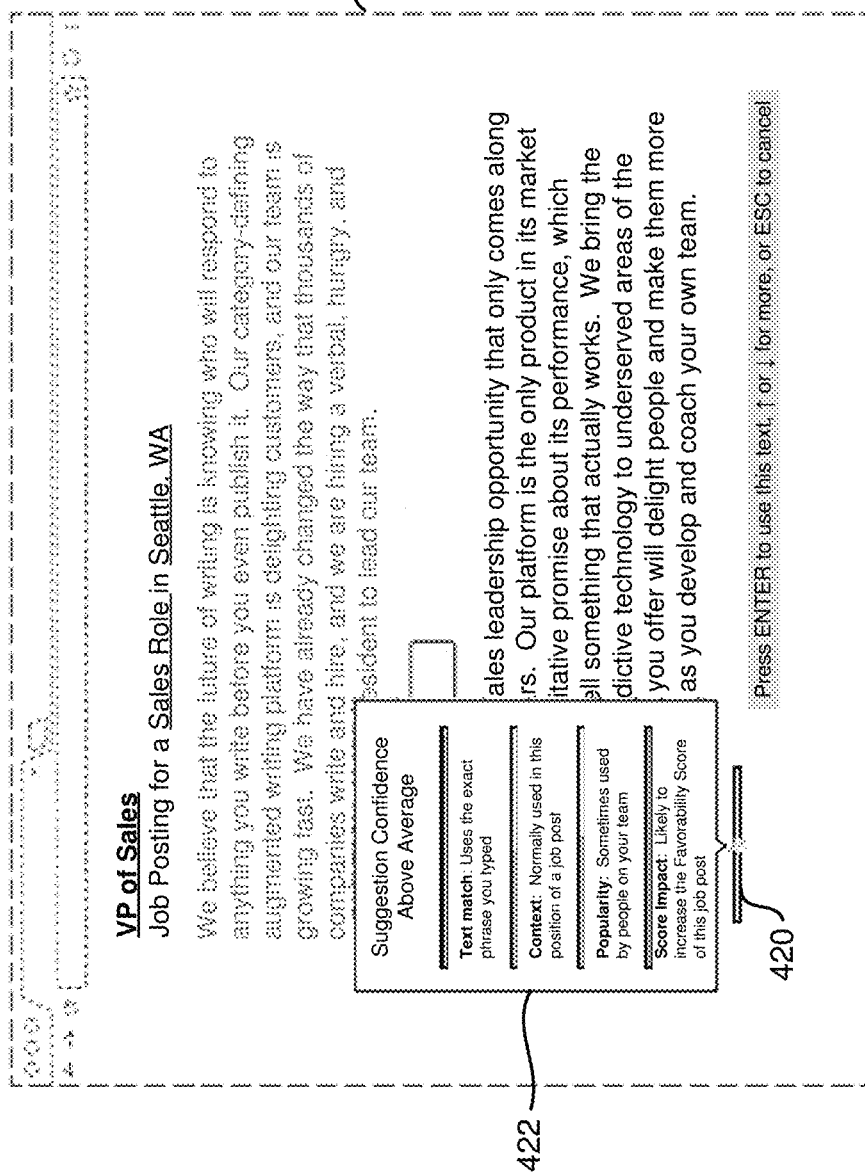

As shown in the user interface 118E of FIG. 4E, a bar 420 is also presented at the bottom of the suggested text. Responsive to the user hovering over the bar 420, an evaluation window 422 including the evaluation results of the suggested text is generated on the user interface 118E. Among other things, the evaluation window includes a suggestion confidence score that is "above average," along with a list of evaluations that were contributing factors to the suggested confidence score. Specifically, one evaluation score indicates that the suggested text uses the exact word or phrase "opportunity" that was input by the user, one evaluation score indicates the suggested text was normally used as the second paragraph of a recruiting document, one evaluation score indicates that the suggested text was sometimes used by people on the same team as the document author, and one evaluation score indicates the assessment of the input document with the suggested text.

The user may further edit the input document, and once the document has been finalized, the document input module 114 may provide the document to the document posting module 138 in the posting server 134. As discussed above, the document posting module 138 posts documents to a computer network and collects outcome data for the posted documents. Alternatively, the user may collect the outcome data and provide it to the analysis server 126.

Figure 5:
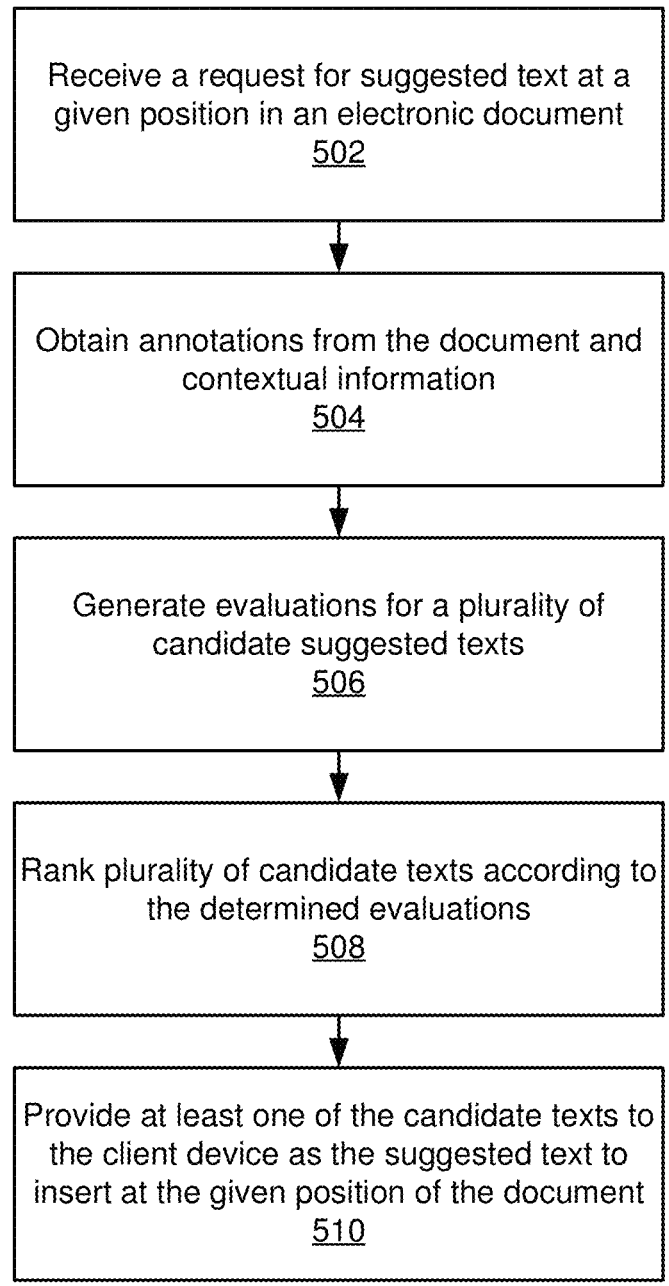
FIG. 5 is a flowchart illustrating a process for suggesting text to insert in an input document, according to one embodiment.

FIG. 5 is a flowchart illustrating a process of suggesting text to insert in an input document, according to one embodiment. In one embodiment, the process of FIG. 5 is performed by the analysis server 126. Other entities may perform some or all of the steps of the process in other embodiments. Likewise, embodiments may include different and/or additional steps, or perform the steps in different orders.

A request for suggested text to insert at a given position in an electronic document is received 502 from a client device. The document may be generated by a user of an organization. A set of annotations is obtained 504 from the document and contextual information associated with the document. The annotations describe predictive characteristics of the suggested text to insert at the requested position of the electronic document. In addition to the annotations, the contextual information may also include a user query of one or more words that encapsulates the desired meaning of the text to insert. A meaning vector is determined that characterizes the meaning of the user query text. Evaluations are generated 506 for a set of candidate texts using the set of annotations. Specifically, the evaluations may include a search score determined by comparing the set of annotations of the input document to a set of annotations of the candidate texts. The evaluations may also include a meaning score determined by comparing the meaning vector for the user query text to meaning vectors of the candidate texts. The set of candidate texts are ranked 508 according to the determined evaluations. The set of candidate texts are filtered to discard candidate texts that have identical or near-identical content to other candidate texts or to text units in the input document. The candidate texts may be filtered by comparing text hashes of text units in the input document to text hashes of the set of candidate texts, and discarding texts that have a threshold amount of similar text hashes to other candidate texts or text units within the input document. At least one of the set of candidate texts is provided 510 to the client device as the suggested text to insert at the given position of the electronic document. The electronic document can be completed, and then posted to the network 122 to be used to achieve a specific objective.

OTHER CONSIDERATIONS

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating evaluations of documents based on one or more outcomes of the document. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A method of providing suggested text for an electronic input document, comprising:
receiving, from a client device via a computer network, a request for suggested text to insert at a position in the electronic input document and contextual information about the input document, the request including a user query text of one or more words provided by a user of the client device characterizing meaning of the suggested text to insert at the requested position of the input document;

identifying a set of annotations for the input document to from the received contextual information of the input document, the annotations describing predictive characteristics of the suggested text to insert at the requested position of the input document;

representing the user query text as coarse and fine vectors that characterize meaning of the user query text, the fine vector characterizing the meaning of the user query text at a higher precision than the coarse vector;

evaluating a set of candidate texts generated from a set of source documents using the set of annotations and the user query text to generate confidence scores for the candidate texts, a confidence score for a candidate text indicating suitability of the candidate text for use as the suggested text, evaluating the set of candidate texts comprising:
identifying a subset of coarsely matching candidate texts by comparing the coarse vector for the user query text to coarse vectors for the candidate texts of the set,
determining a respective search score for each candidate text of the subset by comparing the set of annotations for the input document to sets of annotations for the candidate texts of the subset,
determining a respective meaning score for each candidate text of the subset by comparing the fine vector for the user query text to fine vectors for the candidate texts of the subset,
determining a respective confidence score for each candidate text of the subset as a combination of the respective search score and the respective meaning score for each candidate text of the subset, and
ranking the candidate texts of the subset based on the respective confidence scores; and providing at least one candidate text of the set of candidate texts to the client device as the suggested text responsive to the confidence scores;

wherein the client device is adapted to insert the suggested text at the requested position of the input document.

2. The method of claim 1, wherein evaluating the set of candidate texts comprises:
comparing an annotation from the set of annotations for the input document indicating the position of the suggested text in the input document with an annotation from the set of annotations for each candidate text of the set indicating a position of the candidate text within a source document from which the candidate text was constructed to determine a correspondence between the positions, wherein a greater correspondence produces a higher confidence score for the candidate text of the set.

3. The method of claim 1, further comprising:
identifying an organization with which a user of the client device is associated;
selecting the set of source documents from a document corpus, the selected set of source documents associated with the organization;
deconstructing the source documents into the set of candidate texts; and
generating a set of annotations for each candidate text of the set responsive to the respective source documents from which the set of candidate texts were deconstructed.

4. The method of claim 1, wherein providing at least one candidate text of the set of candidate texts to the client device comprises:
providing the candidate texts of the set to the client device in the ranked order,
wherein the client device is adapted to display one of the candidate texts individually at the requested position of the input document and, responsive to an input from a user of the client device, display a next candidate text in the ranked order individually at the requested position of the input document in place of the displayed candidate text.

5. The method of claim 1, further comprising filtering the set of candidate texts to discard candidate texts with a threshold amount of content similarity to other candidate texts, wherein the filtering comprises:
identifying duplicate groups of candidate texts associated with text hashes having a threshold amount of similarity with one another by comparing the text hashes for the set of candidate texts; and
selecting a representative text from a duplicate group of candidate text, and discarding the remaining texts in the duplicate group for use as the suggested text.

6. A system for providing suggested text for an electronic input document, comprising:
a computer processor for executing computer program instructions; and
a non-transitory computer-readable storage medium storing computer program instructions executable by the processor to perform operations comprising:
receiving, from a client device via a computer network, a request for suggested text to insert at a position in the electronic input document and contextual information about the input document, the request including a user query text of one or more words provided by a user of the client device characterizing meaning of the suggested text to insert at the requested position of the input document;
identifying a set of annotations for the input document from the received contextual information of the input document, the annotations describing predictive characteristics of the suggested text to insert at the requested position of the input document;
representing the user query text as coarse and fine vectors that characterize the meaning of the user query text, the fine vector characterizing the meaning of the user query text at a higher precision than the coarse vector;
evaluating a set of candidate texts generated from a set of source documents using the set of annotations and the user query text to generate confidence scores for the candidate texts, a confidence score for a candidate text indicating suitability of the candidate text for use as the suggested text, evaluating the set of candidate texts comprising:
identifying a subset of coarsely matching candidate texts by comparing the coarse vector for the user query text to coarse vectors for the candidate texts of the set,
determining a respective search score for each candidate text of the subset by comparing the set of annotations for the input document to sets of annotations for the candidate texts of the subset,
determining a respective meaning score for each candidate text of the subset by comparing the fine vector for the user query text to fine vectors for the candidate texts of the subset,
determining a respective confidence score for each candidate text of the subset as a combination of the respective search score and the respective meaning score for each candidate text of the subset, and ranking the candidate texts of the subset based on the respective confidence scores; and providing at least one candidate text of the set of candidate texts to the client device as the suggested text responsive to the confidence scores;

wherein the client device is adapted to insert the suggested text at the requested position of the input document.

7. The system of claim 6, wherein evaluating the set of candidate texts comprises:

comparing an annotation from the set of annotations for the input document indicating the position of the suggested text in the input document with an annotation from the set of annotations for each candidate text of the set indicating a position of the candidate text within a source document from which the candidate text was constructed to determine a correspondence between the positions, wherein a greater correspondence produces a higher confidence score for the candidate text of the set.

8. The system of claim 6, the operations further comprising:

identifying an organization with which a user of the client device is associated;

selecting the set of source documents from a document corpus, the selected set of source documents associated with the organization;

deconstructing the source documents into the set of candidate texts; and generating a set of annotations for each candidate text of the set responsive to the respective source documents from which the set of candidate texts were deconstructed.

9. The system of claim 6, wherein providing at least one candidate text of the set of candidate texts to the client device comprises:

providing the candidate texts of the set to the client device in the ranked order, wherein the client device is adapted to display one of the candidate texts individually at the requested position of the input document and, responsive to an input from a user of the client device, display a next candidate text in the ranked order individually at the requested position of the input document in place of the displayed candidate text.

10. The system of claim 6, the operations further comprising filtering the set of candidate texts to discard candidate texts with a threshold amount of content similarity to other candidate texts, wherein the filtering comprises:

identifying duplicate groups of candidate texts associated with text hashes having a threshold amount of similarity with one another by comparing the text hashes for the set of candidate texts; and selecting a representative text from a duplicate group of candidate text, and discarding the remaining texts in the duplicate group for use as the suggested text.

11. A non-transitory computer-readable storage medium storing computer program instructions executable by a processor to perform operations for providing suggested text for an electronic input document, the operations comprising:

receiving, from a client device via a computer network, a request for suggested text to insert at a position in the electronic input document and contextual information about the input document, the request including a user query text of one or more words provided by a user of the client device characterizing meaning of the suggested text to insert at the requested position of the input document;

identifying a set of annotations for the input document from the received contextual information of the input document, the annotations describing predictive characteristics of the suggested text to insert at the requested position of the input document;

representing the user query text as coarse and fine vectors that characterize meaning of the user query text, the fine vector characterizing the meaning of the user query text at a higher precision than the coarse vector;

evaluating a set of candidate texts generated from a set of source documents using the set of annotations and the user query text to generate confidence scores for the candidate texts, a confidence score for a candidate text indicating suitability of the candidate text for use as the suggested text, evaluating the set of candidate texts comprising:

identifying a subset of coarsely matching candidate texts by comparing the coarse vector for the user query text to coarse vectors for the candidate texts of the set, determining a respective search score for each candidate text of the subset by comparing the set of annotations for the input document to sets of annotations for the candidate texts of the subset, determining a respective meaning score for each candidate text of the subset by comparing the fine vector for the user query text to fine vectors for the candidate texts of the subset, determining a respective confidence score for each candidate text of the subset as a combination of the respective search score and the respective meaning score for each candidate text of the subset, and ranking the candidate texts of the subset based on the respective confidence scores; and providing at least one candidate text of the set of candidate texts to the client device as the suggested text responsive to the confidence scores;

wherein the client device is adapted to insert the suggested text at the requested position of the input document.

12. The computer-readable storage medium of claim 11, wherein evaluating the set of candidate texts comprises:

comparing an annotation from the set of annotations for the input document indicating the position of the suggested text in the input document with an annotation from the set of annotations for each candidate text of the set indicating a position of the candidate text within a source document from which the candidate text was constructed to determine a correspondence between the positions, wherein a greater correspondence produces a higher confidence score for the candidate text of the set.

13. The computer-readable storage medium of 11, wherein the instructions further comprise:

identifying an organization with which a user of the client device is associated;

selecting the set of source documents from a document corpus, the selected set of source documents associated with the organization;

deconstructing the source documents into the set of candidate texts; and generating a set of annotations for each candidate text of the set responsive to the respective source documents from which the set of candidate texts were deconstructed.

14. The computer-readable storage medium of 11, wherein providing at least one candidate text of the set of candidate texts to the client device comprises:
- providing the candidate texts of the set to the client device in the ranked order,
- wherein the client device is adapted to display one of the candidate texts individually at the requested position of the input document and, responsive to an input from a user of the client device, display a next candidate text in the ranked order individually at the requested position of the input document in place of the displayed candidate text.

15. The computer-readable storage medium of 11, wherein the instructions further comprise filtering the set of candidate texts to discard candidate texts with a threshold amount of content similarity to other candidate texts, wherein the filtering comprises:
- identifying duplicate groups of candidate texts associated with text hashes having a threshold amount of similarity with one another by comparing the text hashes for the set of candidate texts; and
- selecting a representative text from a duplicate group of candidate text, and discarding the remaining texts in the duplicate group for use as the suggested text.

* * * * *